(12) United States Patent
Kim et al.

(10) Patent No.: US 10,445,611 B1
(45) Date of Patent: Oct. 15, 2019

(54) METHOD FOR DETECTING PSEUDO-3D BOUNDING BOX TO BE USED FOR MILITARY PURPOSE, SMART PHONE OR VIRTUAL DRIVING BASED-ON CNN CAPABLE OF CONVERTING MODES ACCORDING TO CONDITIONS OF OBJECTS AND DEVICE USING THE SAME

(71) Applicant: Stradvision, Inc., Pohang, Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyu Nam, Pohang-si (KR); SukHoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Pohang-si (KR); Hongmo Je, Pohang-si (KR); Hojin Cho, Gyeongsangbuk-do (KR)

(73) Assignee: Stradvision, Inc., Pohang, Gyeongbuk (KR)

( * ) Notice: Subject to any disclaimer, the term of this patent is extended or adjusted under 35 U.S.C. 154(b) by 0 days.

(21) Appl. No.: 16/258,186

(22) Filed: Jan. 25, 2019

(51) Int. Cl.
*G06K 9/46* (2006.01)
*G06K 9/62* (2006.01)
(Continued)

(52) U.S. Cl.
CPC ......... *G06K 9/4628* (2013.01); *G06K 9/6256* (2013.01); *G06N 3/084* (2013.01);
(Continued)

(58) Field of Classification Search
CPC combination set(s) only.
See application file for complete search history.

(56) References Cited

U.S. PATENT DOCUMENTS 9,946,960 B1 * 4/2018 Kim ................... G06K 9/6256
9,996,890 B1 * 6/2018 Cinnamon ............... G06T 7/73
(Continued)

*Primary Examiner* — Tsung Yin Tsai
(74) *Attorney, Agent, or Firm* — Kaplan Breyer Schwarz, LLP

(57) ABSTRACT

A method for detecting at least one pseudo-3D bounding box based on a CNN capable of converting modes according to conditions of objects in an image is provided. The method includes steps of: a learning device (a) instructing a pooling layer to generate a pooled feature map corresponding to a 2D bounding box, and instructing a type-classifying layer to determine whether objects in the pooled feature map are truncated or non-truncated; (b) instructing FC layers to generate box pattern information corresponding to the pseudo-3D bounding box; (c) instructing classification layers to generate orientation class information on the objects, and regression layers to generate regression information on coordinates of the pseudo-3D bounding box; and (d) back-propagating class losses and regression losses generated from FC loss layers. Through the method, rendering of truncated objects can be performed while virtual driving, and this is useful for mobile devices and also for military purpose.

30 Claims, 8 Drawing Sheets

(51) Int. Cl.
*G06N 3/08* (2006.01)
*G06N 5/04* (2006.01)
*G06T 7/11* (2017.01)

(52) U.S. Cl.
CPC ............... *G06N 5/046* (2013.01); *G06T 7/11* (2017.01); *G06T 2207/20084* (2013.01)

(56) References Cited

U.S. PATENT DOCUMENTS

| | | | |
|---|---|---|---|
| 10,007,865 B1* | 6/2018 | Kim | G06K 9/6231 |
| 10,169,679 B1* | 1/2019 | Kim | G06K 9/6256 |
| 2016/0104058 A1* | 4/2016 | He | G06K 9/6255 |
| | | | 382/156 |
| 2017/0011281 A1* | 1/2017 | Dijkman | G06K 9/66 |
| 2017/0124415 A1* | 5/2017 | Choi | G06N 3/08 |
| 2017/0147905 A1* | 5/2017 | Huang | G06K 9/6232 |
| 2017/0206431 A1* | 7/2017 | Sun | G06N 3/084 |

\* cited by examiner (A) TRUNCATED  (B) NON-TRUNCATED

METHOD FOR DETECTING PSEUDO-3D BOUNDING BOX TO BE USED FOR MILITARY PURPOSE, SMART PHONE OR VIRTUAL DRIVING BASED-ON CNN CAPABLE OF CONVERTING MODES ACCORDING TO CONDITIONS OF OBJECTS AND DEVICE USING THE SAME

FIELD OF THE DISCLOSURE

The present disclosure relates to a learning method, a learning device, a testing method and a testing device for use with an autonomous vehicle, virtual driving, and the like; and more particularly, to the learning method and the learning device for detecting at least one pseudo-3D bounding box based on a CNN, and the testing method and the testing device using the same.

BACKGROUND OF THE DISCLOSURE

An autonomous car is a vehicle that is capable of sensing its environment and navigating without human input. Autonomous cars use a variety of techniques to detect their surroundings, such as radar, laser light, GPS, odometry, and computer vision.

Estimating three-dimensional (3D) information from two-dimensional (2D) monocular images by using the computer vision is an important task in applications such as autonomous driving and personal robotics. In general, a 2D box for bounding an object in an image is created and then a 3D model is constructed from the 2D box.

To find the 2D box for bounding an object, conventional technologies used template-based method in general. One of the conventional methods for creating the 2D box is a sliding windows method. The method slides a window-like box repeatedly over a whole image with varying scales and detects each object inside the window-like box. That is, as the objects in the image can be of very different sizes or scales, the image is scaled down several times and the window-like box is slid over the image again to find the objects at different sizes.

One of other conventional methods is an anchor box method. In this method, various anchor boxes are centered at a certain position and an anchor box with the highest probability, e.g., the highest overlapping region with a ground truth object, among the various anchor boxes, is determined by using regression analysis.

Then, a 3D bounding box is constructed from the determined anchor box, however, there are limitations. First, the 3D bounding box may have six surfaces and three surfaces among the six surfaces may require exhaustive searches. Second, in case a single template is used for determining the three surfaces of the 3D bounding box, an accuracy may be low because boundary conditions of regression may vary as 3D orientation of the object changes. Third, conventional methods of acquiring the 3D bounding box require much computational resources. For example, matching a cuboid template or voxel for finding a 3D bounding box takes up a lot of computational time.

Thus, the present disclosure proposes a new method for removing such redundant computation and improving the accuracy of detection.

SUMMARY OF THE DISCLOSURE

It is an object of the present disclosure to solve all the aforementioned problems.

It is another object of the present disclosure to simplify a 3D bounding box for circumscribing a 3D object by using a pseudo-3D box.

It is still another object of the present disclosure to reduce computational time and resources by using 2D coordinates of vertices of the pseudo-3D box.

In accordance with one aspect of the present disclosure, there is provided a method for detecting at least one pseudo-3D bounding box based on a CNN, including steps of: (a) a learning device, if at least one feature map and at least one 2D bounding box are acquired, wherein the feature map is generated from one or more convolution operations on at least one training image, and wherein the 2D bounding box includes at least one object on the training image, instructing a pooling layer to apply at least one pooling operation to at least one region, corresponding to the 2D bounding box, on the feature map, to thereby generate at least one pooled feature map, and instructing a type-classifying layer to determine whether an image of the object in the pooled feature map is truncated or non-truncated, by referring to the pooled feature map; (b) the learning device, supposing that the object is a first type if the image of the object is truncated and that the the object is a second type if the image of the object is non-truncated, instructing one of FC layers, each of which corresponds to each of the first type and the second type, to apply at least one neural network operation to the pooled feature map by referring to information on whether the image of the object in the pooled feature map is truncated or non-truncated, to thereby generate box pattern information corresponding to the pseudo-3D bounding box; (c) the learning device (i) instructing each of classification layers corresponding to each of the FC layers to generate orientation class information on an orientation of the object by referring to the box pattern information, and (ii) instructing each of regression layers corresponding to each of the FC layers to generate regression information on coordinates of the pseudo-3D bounding box corresponding to coordinates of the 2D bounding box by referring to the box pattern information; and (d) the learning device instructing one or more FC loss layers to generate one or more class losses and one or more regression losses by referring to the orientation class information and the regression information and their corresponding one or more GTs, to thereby learn parameters of the FC layers by backpropagating the class losses and the regression losses.

As one example, after the step of (a), the learning device instructs a type loss layer to generate one or more type losses by referring to the information on whether the image of the object is truncated or non-truncated and its corresponding object-type GT, to thereby adjust at least part of parameters of the type-classifying layer by backpropagating the type losses.

As one example, at the step of (a), the learning device instructs the type-classifying layer to determine the image of the object as truncated if a ratio of an area including only part of the object represented on the pooled feature map to an area including a whole of the object is less than or equal to a certain threshold, and to determine the image of the object as non-truncated if the ratio is greater than the certain threshold.

As one example, at the step of (c), the learning device instructs each of the regression layers to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

As one example, at the step of (b), the learning device, if the object is the first type, instructs a first FC layer corresponding to the first type to apply the neural network operation to the pooled feature map, to thereby generate first box pattern information corresponding to the pseudo-3D bounding box, and if the object is the second type, instructs a second FC layer corresponding to the second type to apply the neural network operation to the pooled feature map, to thereby generate second box pattern information corresponding to the pseudo-3D bounding box, and, at the step of (c), the learning device (i) instructs a first classification layer corresponding to the first FC layer to generate first orientation class information corresponding to the orientation of the object with the first type by referring to the first box pattern information, and instructs a first regression layer corresponding to the first FC layer to generate first regression information on the coordinates of the pseudo-3D bounding box corresponding to the coordinates of the 2D bounding box by referring to the first box pattern information, and (ii) instructs a second classification layer corresponding to the second FC layer to generate second orientation class information corresponding to the orientation of the object with the second type by referring to the second box pattern information, and instructs a second regression layer corresponding to the second FC layer to generate second regression information on the coordinates of the pseudo-3D bounding box corresponding to the coordinates of the 2D bounding box by referring to the second box pattern information.

As one example, at the step of (d), the learning device (i) instructs a first FC loss layer corresponding to the first FC layer to generate one or more first orientation class losses and one or more first box regression losses by referring to the first orientation class information and the first regression information and their corresponding one or more first GTs, to thereby learn parameters of the first FC layer by backpropagating the first orientation class losses and the first box regression losses, and (ii) instructs a second FC loss layer corresponding to the second FC layer to generate one or more second orientation class losses and one or more second box regression losses by referring to the second orientation class information and the second regression information and their corresponding one or more second GTs, to thereby learn parameters of the second FC layer by backpropagating the second orientation class losses and the second box regression losses.

As one example, the learning device has acquired the feature map and the 2D bounding box from an object detector based on a preceding CNN.

As one example, the learning device has inputted the training image into the object detector, and the object detector instructs (i) a preceding convolutional layer to generate the feature map by the convolution operations on the training image, (ii) an RPN to generate at least one proposal box corresponding to the object in the training image, from the feature map, (iii) a preceding pooling layer to apply the pooling operation to at least one region, corresponding to the proposal box, on the feature map, to thereby generate a preceding pooled feature map, (iv) a preceding FC layer to generate object pattern information corresponding to the object, (v) a preceding classification layer to generate object class information corresponding to a class of the object by referring to the object pattern information, and (vi) a preceding regression layer to generate preceding regression information on the 2D bounding box corresponding to the object by referring to the object pattern information, to thereby generate the feature map and the 2D bounding box.

As one example, on condition that the object detector is being learned by a detector-learning device, the detector-learning device instructs a type loss layer in the object detector to generate one or more type losses by referring to information on whether the image of the object is truncated or non-truncated and its corresponding object-type GT, to thereby adjust at least part of parameters of the type-classifying layer in the object detector by backpropagating the type losses.

In accordance with another aspect of the present disclosure, there is provided a method for detecting at least one pseudo-3D bounding box based on a CNN, including steps of: (a) on condition that a learning device has acquired at least one feature map for training and at least one 2D bounding box for training, wherein the feature map for training is generated from one or more convolution operations on at least one training image, and wherein the 2D bounding box for training includes at least one object for training on the training image, and has performed processes of (i) instructing a pooling layer to apply at least one pooling operation to at least one region, corresponding to the 2D bounding box for training, on the feature map for training, to thereby generate at least one pooled feature map for training, and instructing a type-classifying layer to determine whether an image of the object for training in the pooled feature map for training is truncated or non-truncated, by referring to the pooled feature map for training, (ii) supposing that the object for training is a first type if the image of the object for training is truncated and that the object is a second type if the image of the object for training is non-truncated, instructing one of FC layers, each of which corresponds to each of the first type and the second type, to apply at least one neural network operation to the pooled feature map for training by referring to information on whether the image of the object for training in the pooled feature map for training is truncated or non-truncated, to thereby generate box pattern information for training corresponding to the pseudo-3D bounding box for training, (iii) instructing each of one or more classification layers corresponding to each of the FC layers to generate orientation class information for training on an orientation of the object for training by referring to the box pattern information for training, and instructing each of one or more regression layers corresponding to each of the FC layers to generate regression information for training on coordinates of the pseudo-3D bounding box for training corresponding to coordinates of the 2D bounding box for training by referring to the box pattern information for training, and (iv) instructing one or more FC loss layers to generate one or more class losses and one or more regression losses by referring to the orientation class information for training and the regression information for training and their corresponding one or more GTs, to thereby learn parameters of the FC layers by backpropagating the class losses and the regression losses; a testing device, if at least one feature map for testing and at least one 2D bounding box for testing are acquired, wherein the feature map for testing is generated from the convolution operations on at least one test image, and wherein the 2D bounding box for testing includes at least one object for testing on the test image, instructing the pooling layer to apply the pooling operation to at least one region, corresponding to the 2D bounding box for testing, on the feature map for testing, to thereby generate at least one pooled feature map for testing, and instructing the type-classifying layer to determine whether an image of the object for testing in the pooled feature map for testing is truncated or non-truncated, by referring to the pooled feature map for testing; (b) the testing device, supposing that the object for testing is the first type if the image of the object for testing is truncated and that the object for testing is the second type if the image of the object for testing is non-truncated, instructing one of the FC layers, each of which corresponds to each of the first type and the second type, to apply the neural network operation to the pooled feature map for testing by referring to information on whether the image of the object for testing in the pooled feature map for testing is truncated or non-truncated, to thereby generate box pattern information for testing corresponding to the pseudo-3D bounding box for testing; and (c) the testing device (i) instructing each of the classification layers corresponding to each of the FC layers to generate orientation class information for testing on the orientation of the object for testing by referring to the box pattern information for testing, and (ii) instructing each of the regression layers corresponding to each of the FC layers to generate regression information for testing on the coordinates of the pseudo-3D bounding box for testing corresponding to the coordinates of the 2D bounding box for testing by referring to the box pattern information for testing.

As one example, the learning device has instructed a type loss layer to generate one or more type losses by referring to the information on whether the image of the object for training is truncated or non-truncated and its corresponding object-type GT, to thereby adjust at least part of parameters of the type-classifying layer by backpropagating the type losses.

As one example, at the step of (a), the testing device instructs the type-classifying layer to determine the image of the object for testing as truncated if a ratio of an area including only part of the object for testing represented on the pooled feature map for testing to an area including a whole of the object for testing is less than or equal to a certain threshold, and to determine the image of the object for testing as non-truncated if the ratio is greater than the certain threshold.

As one example, at the step of (c), the testing device instructs each of the regression layers to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

As one example, at the step of (b), the testing device, if the object for testing is the first type, instructs a first FC layer corresponding to the first type to apply the neural network operation to the pooled feature map for testing, to thereby generate first box pattern information for testing corresponding to the pseudo-3D bounding box for testing, and if the object for testing is the second type, instructs a second FC layer corresponding to the second type to apply the neural network operation to the pooled feature map for testing, to thereby generate second box pattern information for testing corresponding to the pseudo-3D bounding box for testing, and, at the step of (c), the testing device (i) instructs a first classification layer corresponding to the first FC layer to generate first orientation class information for testing corresponding to the orientation of the object for testing with the first type by referring to the first box pattern information for testing, and instructs a first regression layer corresponding to the first FC layer to generate first regression information for testing on the coordinates of the pseudo-3D bounding box for testing corresponding to the coordinates of the 2D bounding box for testing by referring to the first box pattern information for testing, and (ii) instructs a second classification layer corresponding to the second FC layer to generate second orientation class information for testing corresponding to the orientation of the object for testing with the second type by referring to the second box pattern information for testing, and instructs a second regression layer corresponding to the second FC layer to generate second regression information for testing on the coordinates of the pseudo-3D bounding box for testing corresponding to the coordinates of the 2D bounding box for testing by referring to the second box pattern information for testing.

As one example, the testing device has inputted the test image into an object detector based on a preceding CNN, and the object detector instructs (i) a preceding convolutional layer to generate the feature map for testing by the convolution operations on the test image, (ii) an RPN to generate at least one proposal box for testing corresponding to the object for testing in the test image, from the feature map for testing, (iii) a preceding pooling layer to apply the pooling operation to at least one region, corresponding to the proposal box for testing, on the feature map for testing, to thereby generate a preceding pooled feature map for testing, (iv) a preceding FC layer to generate object pattern information for testing corresponding to the object for testing, (v) a preceding classification layer to generate object class information for testing corresponding to a class of the object for testing by referring to the object pattern information for testing, and (vi) a preceding regression layer to generate preceding regression information for testing on the 2D bounding box for testing corresponding to the object for testing by referring to the object pattern information for testing, to thereby generate the feature map for testing and the 2D bounding box for testing.

In accordance with still another aspect of the present disclosure, there is provided a learning device for detecting at least one pseudo-3D bounding box based on a CNN, including: at least one memory that stores instructions; and at least one processor configured to execute the instructions to: perform processes of (I) instructing a pooling layer to apply at least one pooling operation to at least one region, corresponding to at least one 2D bounding box, on at least one feature map, to thereby generate at least one pooled feature map, wherein the feature map is generated from one or more convolution operations on at least one training image, and wherein the 2D bounding box includes at least one object on the training image, and instructing a type-classifying layer to determine whether an image of the object in the pooled feature map is truncated or non-truncated, by referring to the pooled feature map, (II) supposing that the object is a first type if the image of the object is truncated and that the the object is a second type if the image of the object is non-truncated, instructing one of FC layers, each of which corresponds to each of the first type and the second type, to apply at least one neural network operation to the pooled feature map by referring to information on whether the image of the object in the pooled feature map is truncated or non-truncated, to thereby generate box pattern information corresponding to the pseudo- 3D bounding box, (III) (i) instructing each of classification layers corresponding to each of the FC layers to generate orientation class information on an orientation of the object by referring to the box pattern information, and (ii) instructing each of regression layers corresponding to each of the FC layers to generate regression information on coordinates of the pseudo-3D bounding box corresponding to coordinates of the 2D bounding box by referring to the box pattern information, and (IV) instructing one or more FC loss layers to generate one or more class losses and one or more regression losses by referring to the orientation class information and the regression information and their corresponding one or more GTs, to thereby learn parameters of the FC layers by backpropagating the class losses and the regression losses.

As one example, after the process of (I), the processor instructs a type loss layer to generate one or more type losses by referring to the information on whether the image of the object is truncated or non-truncated and its corresponding object-type GT, to thereby adjust at least part of parameters of the type-classifying layer by backpropagating the type losses.

As one example, at the process of (I), the processor instructs the type-classifying layer to determine the image of the object as truncated if a ratio of an area including only part of the object represented on the pooled feature map to an area including a whole of the object is less than or equal to a certain threshold, and to determine the image of the object as non-truncated if the ratio is greater than the certain threshold.

As one example, at the process of (III), the processor instructs each of the regression layers to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

As one example, at the process of (II), the processor, if the object is the first type, instructs a first FC layer corresponding to the first type to apply the neural network operation to the pooled feature map, to thereby generate first box pattern information corresponding to the pseudo-3D bounding box, and if the object is the second type, instructs a second FC layer corresponding to the second type to apply the neural network operation to the pooled feature map, to thereby generate second box pattern information corresponding to the pseudo-3D bounding box, and, at the process of (III), the processor (i) instructs a first classification layer corresponding to the first FC layer to generate first orientation class information corresponding to the orientation of the object with the first type by referring to the first box pattern information, and instructs a first regression layer corresponding to the first FC layer to generate first regression information on the coordinates of the pseudo-3D bounding box corresponding to the coordinates of the 2D bounding box by referring to the first box pattern information, and (ii) instructs a second classification layer corresponding to the second FC layer to generate second orientation class information corresponding to the orientation of the object with the second type by referring to the second box pattern information, and instructs a second regression layer corresponding to the second FC layer to generate second regression information on the coordinates of the pseudo-3D bounding box corresponding to the coordinates of the 2D bounding box by referring to the second box pattern information.

As one example, at the process of (IV), the processor (i) instructs a first FC loss layer corresponding to the first FC layer to generate one or more first orientation class losses and one or more first box regression losses by referring to the first orientation class information and the first regression information and their corresponding one or more first GTs, to thereby learn parameters of the first FC layer by backpropagating the first orientation class losses and the first box regression losses, and (ii) instructs a second FC loss layer corresponding to the second FC layer to generate one or more second orientation class losses and one or more second box regression losses by referring to the second orientation class information and the second regression information and their corresponding one or more second GTs, to thereby learn parameters of the second FC layer by backpropagating the second orientation class losses and the second box regression losses.

As one example, the communication part has acquired the feature map and the 2D bounding box from an object detector based on a preceding CNN.

As one example, the communication part has inputted the training image into the object detector, and the object detector instructs (i) a preceding convolutional layer to generate the feature map by the convolution operations on the training image, (ii) an RPN to generate at least one proposal box corresponding to the object in the training image, from the feature map, (iii) a preceding pooling layer to apply the pooling operation to at least one region, corresponding to the proposal box, on the feature map, to thereby generate a preceding pooled feature map, (iv) a preceding FC layer to generate object pattern information corresponding to the object, (v) a preceding classification layer to generate object class information corresponding to a class of the object by referring to the object pattern information, and (vi) a preceding regression layer to generate preceding regression information on the 2D bounding box corresponding to the object by referring to the object pattern information, to thereby generate the feature map and the 2D bounding box.

As one example, on condition that the object detector is being learned by a detector-learning device, the detector-learning device instructs a type loss layer in the object detector to generate one or more type losses by referring to information on whether the image of the object is truncated or non-truncated and its corresponding object-type GT, to thereby adjust at least part of parameters of the type-classifying layer in the object detector by backpropagating the type losses.

In accordance with still yet another aspect of the present disclosure, there is provided a testing device for detecting at least one pseudo-3D bounding box based on a CNN, including: at least one memory that stores instructions; and at least one processor, on condition that a learning device has acquired at least one feature map for training and at least one 2D bounding box for training, wherein the feature map for training is generated from one or more convolution operations on at least one training image, and wherein the 2D bounding box for training includes at least one object for training on the training image, and has performed processes of (i) instructing a pooling layer to apply at least one pooling operation to at least one region, corresponding to the 2D bounding box for training, on the feature map for training, to thereby generate at least one pooled feature map for training, and instructing a type-classifying layer to determine whether an image of the object for training in the pooled feature map for training is truncated or non-truncated, by referring to the pooled feature map for training, (ii) supposing that the object for training is a first type if the image of the object for training is truncated and that the object is a second type if the image of the object for training is non-truncated, instructing one of FC layers, each of which corresponds to each of the first type and the second type, to apply at least one neural network operation to the pooled feature map for training by referring to information on whether the image of the object for training in the pooled feature map for training is truncated or non-truncated, to thereby generate box pattern information for training corresponding to the pseudo-3D bounding box for training, (iii) instructing each of one or more classification layers corresponding to each of the FC layers to generate orientation class information for training on an orientation of the object for training by referring to the box pattern information for training, and instructing each of one or more regression layers corresponding to each of the FC layers to generate regression information for training on coordinates of the pseudo-3D bounding box for training corresponding to coordinates of the 2D bounding box for training by referring to the box pattern information for training, and (iv) instructing one or more FC loss layers to generate one or more class losses and one or more regression losses by referring to the orientation class information for training and the regression information for training and their corresponding one or more GTs, to thereby learn parameters of the FC layers by backpropagating the class losses and the regression losses; configured to execute the instructions to: perform processes of (I) instructing the pooling layer to apply the pooling operation to at least one region, corresponding to at least one 2D bounding box for testing, on at least one feature map for testing, to thereby generate at least one pooled feature map for testing, wherein the feature map for testing is generated from the convolution operations on at least one test image, and wherein the 2D bounding box for testing includes at least one object for testing on the test image, and instructing the type-classifying layer to determine whether an image of the object for testing in the pooled feature map for testing is truncated or non-truncated, by referring to the pooled feature map for testing, (II) supposing that the object for testing is the first type if the image of the object for testing is truncated and that the object for testing is the second type if the image of the object for testing is non-truncated, instructing one of the FC layers, each of which corresponds to each of the first type and the second type, to apply the neural network operation to the pooled feature map for testing by referring to information on whether the image of the object for testing in the pooled feature map for testing is truncated or non-truncated, to thereby generate box pattern information for testing corresponding to the pseudo-3D bounding box for testing, and (III) (i) instructing each of the classification layers corresponding to each of the FC layers to generate orientation class information for testing on the orientation of the object for testing by referring to the box pattern information for testing, and (ii) instructing each of the regression layers corresponding to each of the FC layers to generate regression information for testing on the coordinates of the pseudo-3D bounding box for testing corresponding to the coordinates of the 2D bounding box for testing by referring to the box pattern information for testing.

As one example, the learning device has instructed a type loss layer to generate one or more type losses by referring to the information on whether the image of the object for training is truncated or non-truncated and its corresponding object-type GT, to thereby adjust at least part of parameters of the type-classifying layer by backpropagating the type losses.

As one example, at the process of (I), the processor instructs the type-classifying layer to determine the image of the object for testing as truncated if a ratio of an area including only part of the object for testing represented on the pooled feature map for testing to an area including a whole of the object for testing is less than or equal to a certain threshold, and to determine the image of the object for testing as non-truncated if the ratio is greater than the certain threshold.

As one example, at the process of (III), the processor instructs each of the regression layers to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

As one example, at the process of (II), the processor, if the object for testing is the first type, instructs a first FC layer corresponding to the first type to apply the neural network operation to the pooled feature map for testing, to thereby generate first box pattern information for testing corresponding to the pseudo-3D bounding box for testing, and if the object for testing is the second type, instructs a second FC layer corresponding to the second type to apply the neural network operation to the pooled feature map for testing, to thereby generate second box pattern information for testing corresponding to the pseudo-3D bounding box for testing, and, at the process of (III), the processor (i) instructs a first classification layer corresponding to the first FC layer to generate first orientation class information for testing corresponding to the orientation of the object for testing with the first type by referring to the first box pattern information for testing, and instructs a first regression layer corresponding to the first FC layer to generate first regression information for testing on the coordinates of the pseudo-3D bounding box for testing corresponding to the coordinates of the 2D bounding box for testing by referring to the first box pattern information for testing, and (ii) instructs a second classification layer corresponding to the second FC layer to generate second orientation class information for testing corresponding to the orientation of the object for testing with the second type by referring to the second box pattern information for testing, and instructs a second regression layer corresponding to the second FC layer to generate second regression information for testing on the coordinates of the pseudo-3D bounding box for testing corresponding to the coordinates of the 2D bounding box for testing by referring to the second box pattern information for testing.

As one example, the communication part has inputted the test image into an object detector based on a preceding CNN, and the object detector instructs (i) a preceding convolutional layer to generate the feature map for testing by the convolution operations on the test image, (ii) an RPN to generate at least one proposal box for testing corresponding to the object for testing in the test image, from the feature map for testing, (iii) a preceding pooling layer to apply the pooling operation to at least one region, corresponding to the proposal box for testing, on the feature map for testing, to thereby generate a preceding pooled feature map for testing, (iv) a preceding FC layer to generate object pattern information for testing corresponding to the object for testing, (v) a preceding classification layer to generate object class information for testing corresponding to a class of the object for testing by referring to the object pattern information for testing, and (vi) a preceding regression layer to generate preceding regression information for testing on the 2D bounding box for testing corresponding to the object for testing by referring to the object pattern information for testing, to thereby generate the feature map for testing and the 2D bounding box for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
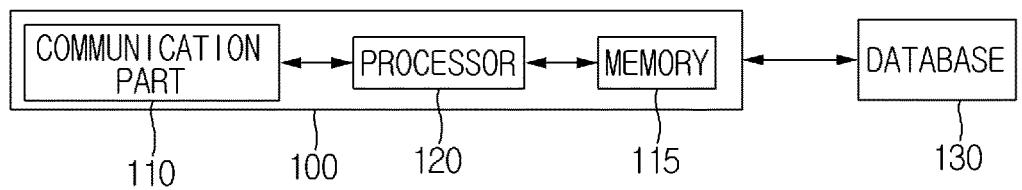
FIG. 1 is a drawing schematically illustrating a learning device for detecting a pseudo-3D bounding box based on a CNN in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

FIG. 1 is a drawing schematically illustrating a learning device for detecting at least one pseudo-3D bounding box based on a CNN in accordance with one example embodiment of the present disclosure, and by referring to FIG. 1, the learning device 100 may include a communication part 110 and a processor 120. In addition, the learning device may further include a memory 115 capable of storing computer readable instructions for performing following processes. As one example, the processor, the memory, a medium, etc. may be integrated with an integrated processor.

First, the communication part 110 may acquire or support another device to acquire at least one feature map and at least one 2D bounding box. Herein, the feature map is generated from one or more convolution operations on at least one training image, and the 2D bounding box circumscribes at least one object on the training image.

Herein, the communication part 110 may acquire or support another device to acquire information on the feature map and the 2D bounding box from a database 130, or from an object detector based on the CNN by inputting the training image stored in the database 130 into the object detector. A process of generating the feature map and the 2D bounding box by using the object detector is described later. Additionally, the database 130 may store at least one ground truth of location information on the pseudo-3D bounding box and orientation class information on the object corresponding to the 2D bounding box. Additionally, the database 130 may store one or more ground truths corresponding to location information on the 2D bounding box and one or more ground truths corresponding to an object class of the object on the training image.

Then, the processor 120 may instruct a pooling layer to apply at least one pooling operation to at least one region, corresponding to the 2D bounding box, on the feature map, to thereby generate at least one pooled feature map, and may instruct a type-classifying layer to determine whether an image of the object in the pooled feature map is truncated or non-truncated, by referring to the pooled feature map. Supposing that the object is a first type if the image of the object is truncated and that the the object is a second type if the image of the object is non-truncated, the processor 120 may instruct one of FC layers, each of which corresponds to each of the first type and the second type, to apply at least one neural network operation to the pooled feature map by referring to information on whether the image of the object in the pooled feature map is truncated or non-truncated, to thereby generate box pattern information corresponding to the pseudo-3D bounding box. Then the processor 120 may (i) instruct each of classification layers corresponding to each of the FC layers to generate orientation class information on an orientation of the object by referring to the box pattern information, and (ii) instruct each of regression layers corresponding to each of the FC layers to generate regression information on coordinates of the pseudo-3D bounding box corresponding to coordinates of the 2D bounding box by referring to the box pattern information. Then, the processor 120 may instruct one or more FC loss layers to generate one or more class losses and one or more regression losses by referring to the orientation class information and the regression information and their corresponding one or more GTs, to thereby learn parameters of the FC layers by backpropagating the class losses and the regression losses.

Further, the processor 120 may instruct a type loss layer to generate one or more type losses by referring to the information on whether the image of the object is truncated or non-truncated and its corresponding object-type GT, to thereby adjust at least part of parameters of the type-classifying layer by backpropagating the type losses.

As another example, (unlike the example of FIG. 2) on condition that an object detector 10 is being learned by a detector-learning device (not illustrated), the detector-learning device may instruct the type loss layer in the object detector 10 to generate the type losses by referring to information on whether the image of the object is truncated or non-truncated and its corresponding object-type GT, to thereby adjust at least part of parameters of the type-classifying layer in the object detector 10 by backpropagating the type losses. That is, while the object detector 10 based on a CNN, i.e., a so-called a preceding CNN, is being learned, the type-classifying layer may also be learned together. Herein, a term 'preceding' is used for layers, inputs, and outputs in the object detector 10 to avoid possible confusion with those in the learning device 100, and will be explained in detail later.

Herein, the learning device 100 in accordance with one example of the present disclosure may be a computing device, and may be any digital device with a processor capable of computation. For reference, although FIG. 1 shows the single learning device 100, the scope of the present disclosure is not limited thereto. For example, the learning device 100 may be configured as several devices to perform its functions.

A learning method for detecting the pseudo-3D bounding box based on the CNN by using the learning device 100 in accordance with one example embodiment of the present disclosure is described by referring to FIG. 2 as follows.

First, the learning device 100 may acquire the feature map and information on the 2D bounding box, where the feature map is generated from the convolution operations on the training image, and where the 2D bounding box includes the object on the training image.

Herein, the learning device 100 may acquire or support another device to acquire information on the feature map and the 2D bounding box from the database, not illustrated, or from the object detector 10 based on the CNN by inputting the training image into the object detector.

Processes of acquiring the feature map and the 2D bounding box from the object detector 10 are described briefly as follows. Herein, a term 'preceding' is used for layers, inputs, and outputs in the object detector 10, which may be placed at an input end right before of the learning device 100 as the most important device of the present disclosure, to avoid possible confusion with those in the learning device 100. Below, operations of each layer in the object detector 10 are described as controlled by the object detector 10, but may be controlled by the learning device 100, as the case may be.

After the object detector 10 acquires the training image from the database, the object detector 10 may instruct at least one preceding convolutional layer 11, which has been learned, to apply the convolution operations to the training image, to thereby generate at least one preceding feature map. Then, the object detector 10 may instruct at least one preceding RPN 12 to generate each preceding proposal box corresponding to the object in the training image from the preceding feature map, and may instruct at least one preceding pooling layer 13 to apply the pooling operation to each region on the preceding feature map corresponding to said each preceding proposal box, to thereby generate at least one preceding pooled feature map. Thereafter, the object detector 10 may instruct at least one preceding FC layer 14, which has been learned, to apply the neural network operation to the preceding pooled feature map, to thereby generate preceding object pattern information corresponding to the object. Herein, the preceding object pattern information, which corresponds to features, may include information on estimated object classes among the object classes to be detected and estimated location information on bounding boxes. Then, the object detector 10 may instruct at least one preceding classification layer 15 to generate preceding class information on the object, e.g., probability information for each class to be detected, by referring to the preceding object pattern information, and may instruct at least one preceding regression layer 16 to generate preceding regression information corresponding to the object by referring to the preceding object pattern information. Herein, the 2D bounding box may be generated by referring to the preceding proposal boxes and the preceding regression information. As a result, the learning device 100 may acquire the feature map and the 2D bounding box of the objects on the training image, by using the preceding feature map generated from the preceding convolutional layer 11 of the object detector 10 based on the CNN, and preceding regression information generated from the preceding regression layer 16.

Next, if the feature map and the 2D bounding box are acquired, the learning device 100 may instruct the pooling layer 121 to apply the pooling operation to at least one region, corresponding to the 2D bounding box, on the feature map, to thereby generate the pooled feature map.

Figure 3:
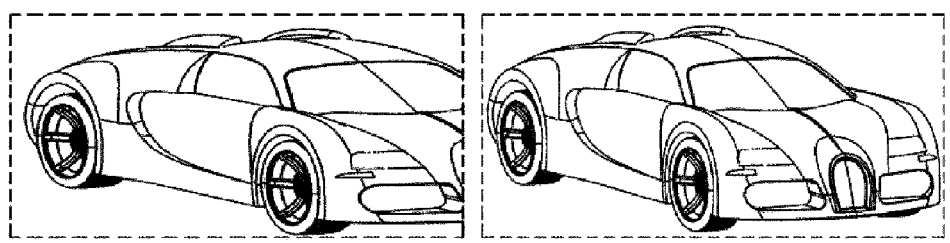
FIG. 3 is a drawing schematically illustrating examples of a truncated and a non-truncated images of an object to be considered for the learning method for detecting the pseudo-3D bounding box based on the CNN in accordance with one example embodiment of the present disclosure.

Then, the learning device 100 may instruct the type-classifying layer 122 to determine whether the image of the object in the pooled feature map is truncated or non-truncated, by referring to the pooled feature map;

As one example, by referring to FIG. 3, the learning device 100 may instruct the type-classifying layer 122, to determine the image of the object as truncated if a ratio of an area including only part of the object represented on the pooled feature map to an area including the whole of the object is less than or equal to a certain threshold as shown in (A), and to determine the image of the object as non-truncated if the ratio is greater than the certain threshold as shown in (B).

Herein, the type-classifying layer 122 may include the FC layers which apply the neural network operation to the pooled feature map, or include an FCN, i.e., Fully Convolutional Network.

Then, supposing that the object is the first type if the image of the object is truncated and that the the object is the second type if the image of the object is non-truncated, the learning device 100 may instruct one of the FC layers 123-1 and 123-2, each of which corresponds to each of the first type and the second type, to apply the neural network operation to the pooled feature map by referring to the information on whether the image of the object in the pooled feature map is truncated or non-truncated, to thereby generate box pattern information corresponding to the pseudo-3D bounding box. Herein, the box pattern information, which corresponds to features, may include information on estimated orientation classes, among the orientation classes to be detected, and estimated location information on the pseudo-3D bounding box.

As one example, if the object is the first type by referring to a result from the type-classifying layer 122, the learning device 100 may instruct a first FC layer 123-1, corresponding to the first type, among the FC layers to apply the neural network operation to the pooled feature map, to thereby generate first box pattern information corresponding to the pseudo-3D bounding box. And if the object is the second type by referring to the result from the type-classifying layer 122, the learning device 100 may instruct a second FC layer 123-2, corresponding to the second type, among the FC layers to apply the neural network operation to the pooled feature map, to thereby generate second box pattern information corresponding to the pseudo-3D bounding box.

Then the learning device 100 may (i) instruct each of classification layers 124-11 and 124-21 corresponding to each of the FC layers 123-1 and 123-2 to generate the orientation class information on the orientation of the object by referring to the box pattern information, and (ii) instruct each of regression layers 124-12 and 124-22 corresponding to each of the FC layers 123-1 and 123-2 to generate regression information on the coordinates of the pseudo-3D bounding box corresponding to the coordinates of the 2D bounding box by referring to the box pattern information.

As one example, the learning device 100 may instruct a first classification layer 124-11 corresponding to the first FC layer 123-1 to generate first orientation class information corresponding to the orientation of the object with the first type by referring to the first box pattern information. For example, the learning device 100 may generate probability information on each of the orientation classes by referring to the first box pattern information, and determine a specific orientation class with a highest probability as the object's orientation class. And the learning device 100 may instruct a first regression layer 124-12 corresponding to the first FC layer 123-1 to generate first regression information on the coordinates of the pseudo-3D bounding box corresponding to the coordinates of the 2D bounding box by referring to the first box pattern information. The learning device 100 may instruct a second classification layer 124-21 corresponding to the second FC layer 123-2 to generate second orientation class information corresponding to the orientation of the object with the second type by referring to the second box pattern information. For example, the learning device 100 may generate probability information on each of the orientation classes by referring to the second box pattern information, and determine a specific orientation class with a highest probability as the object's orientation class. And the learning device 100 may instruct a second regression layer 124-22 corresponding to the second FC layer 123-2 to generate second regression information on the coordinates of the pseudo-3D bounding box corresponding to the coordinates of the 2D bounding box by referring to the second box pattern information.

Figure 4:
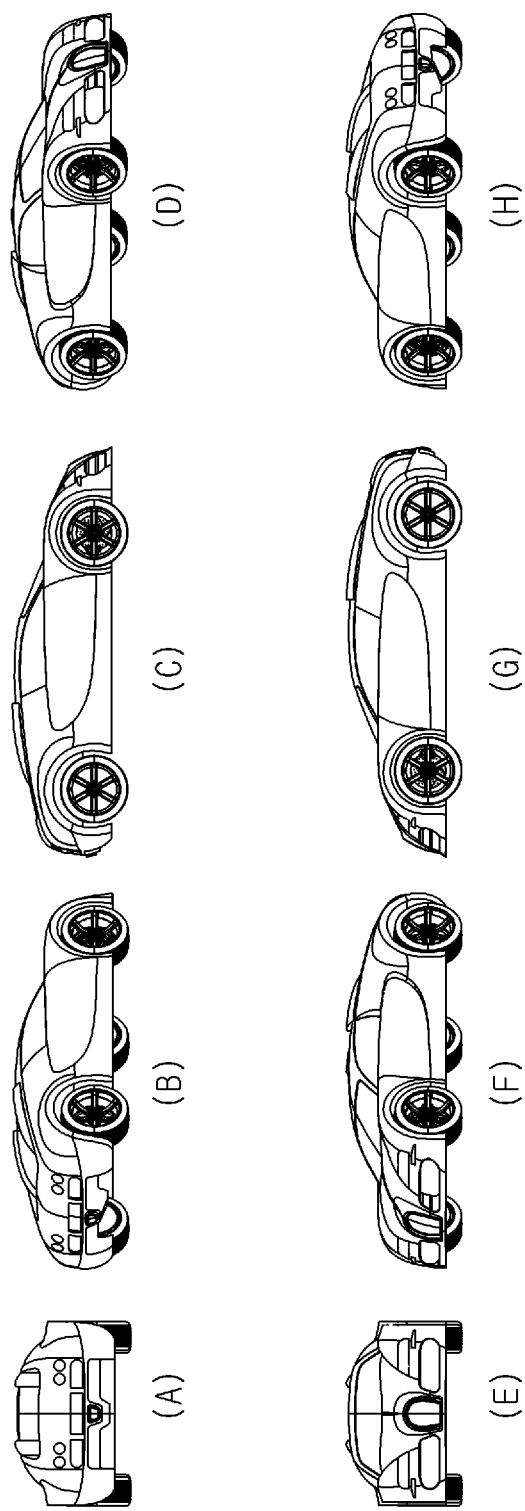
FIG. 4 is a drawing schematically illustrating classes of object orientation to be considered for the learning method for detecting the pseudo-3D bounding box based on the CNN in accordance with one example embodiment of the present disclosure.

Herein, by referring to FIG. 4, the orientation classes may be used for determining the orientation of the object. In case of vehicles, each of the orientation classes may represent a rear face in case of (A), a rear face to the right in case of (B), a right face in case of (C), a front face to the right in case of (D), a front face in case of (E), a front face to the left in case of (F), a left face in case of (G), and a rear face to the left in case of (H) of the vehicle.

Also, the learning device 100 may instruct the regression layers 124-12 and 124-22 to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes. Herein, each of at least one vertex of each of the instance bounding boxes may correspond to each vertex of the 2D bounding box diagonally.

Figure 5:
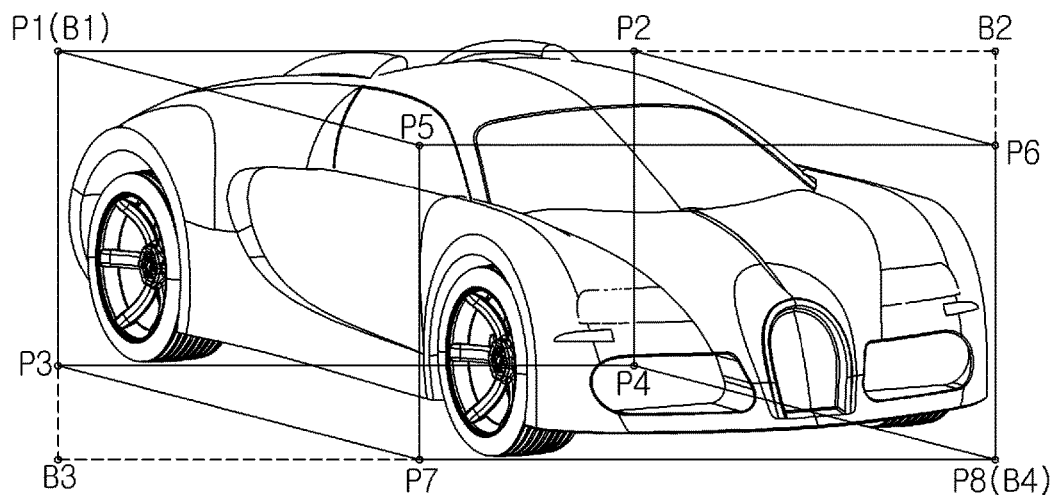
FIG. 5 is a drawing schematically illustrating a process of generating location information on the pseudo-3D bounding box in the learning method for detecting the pseudo-3D bounding box based on the CNN in accordance with one example embodiment of the present disclosure.

As one example, by referring to FIG. 5, the regression information is generated, which may include each displacement between (i) vertices P1, P2, P3, and P4 of one instance bounding box corresponding to one of a front face and a rear face of the object and (ii) vertices B1, B2, B3, and B4 of the 2D bounding box, and each displacement between (i) vertices P5, P6, P7, and P8 of another instance bounding box corresponding to the other one of the front face and the rear face and (ii) the vertices B1, B2, B3, and B4. Herein, the vertex P1 of said one instance bounding box may match the vertex B1 of the 2D bounding box, and the vertex P8 of said another instance bounding box may match the vertex B4 of the 2D bounding box. Further, determination of the front face and the rear face of the object may be performed by using the class information from the classification layer 123.

Also, the regression information may include each displacement between the vertices P1 and P5 at the top-left and each displacement between the vertices P4 and P8 at the bottom-right in said one instance bounding box and said another instance bounding box, and in this case, the vertex at the top-left P1 of said one instance bounding box may match the vertex at the top-left B1 of the 2D bounding box, the vertex at the bottom-right P8 of said another instance bounding box may match the vertex at the bottom-right B4 of the 2D bounding box, therefore, the regression information may include a displacement between the vertices B4 and the P4, and a displacement between the vertices B1 and the P5. On the other hand, as another example, the regression information may include each displacement from the vertices P1, P2, P3, and P4 of said one instance bounding box and the vertices P5, P6, P7, and P8 of said another instance bounding box.

Figure 6:
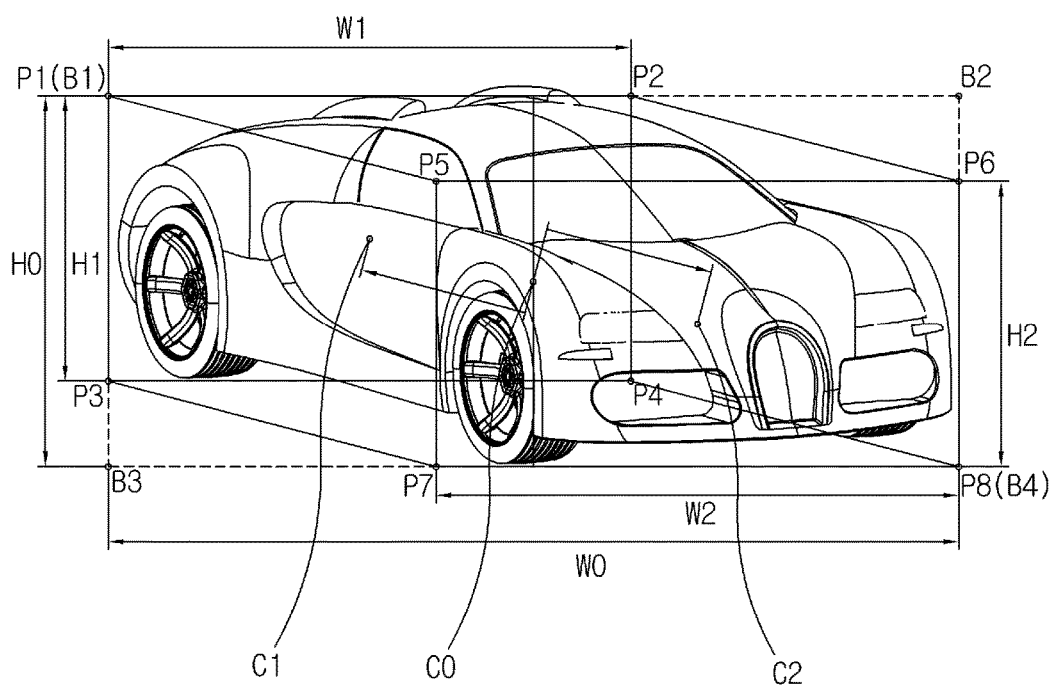
FIG. 6 is a drawing schematically illustrating another process of generating the location information on the pseudo-3D bounding box in the learning method for detecting the pseudo-3D bounding box based on the CNN in accordance with one example embodiment of the present disclosure.

As another example, by referring to FIG. 6, the regression information may include (i) a displacement between a center C1 of the vertices P1, P2, P3, and P4 of said one instance bounding box corresponding to one among the front face and the rear face of the object, and a center C0 of the vertices B1, B2, B3, and B4 of the 2D bounding box, and (ii) a displacement between a center C2 of the vertices P5, P6, P7, and P8 of said another instance bounding box corresponding to the other one among the front face and the rear face and the center C0, and (iii) respective displacements from a width W1 and a height H1 of said one instance bounding box to a width W0 and a height H0 of the 2D bounding box, and respective displacements from a width W2 and a height H2 of said another instance bounding box to the width W0 and the height H0 of the 2D bounding box. Then, coordinates of each vertex of said one instance bounding box and said another instance bounding box may be determined by referring to the regression information.

Meanwhile, supposing that each of diagonal vertices, e.g., B1 and B4, of the 2D bounding box is a first vertex and a second vertex, that an instance bounding box whose at least one vertex matches the first vertex among the instance bounding boxes is a first instance bounding box, and that an instance bounding box whose at least one vertex matches the second vertex among the instance bounding boxes is a second instance bounding box, the learning device 100 may (i) connect vertices of the first and the second instance bounding boxes, which are located on a first pair of two adjacent lines of the 2D bounding box, and connect vertices of the first and the second instance bounding boxes, which are located on a second pair of other two adjacent lines of the 2D bounding box, wherein the two adjacent lines in each of the first and the second pairs do not meet at any of said each of diagonal vertices, and (ii) connect the first vertex and a vertex of the second instance bounding box which is not located on any line of the 2D bounding box, connect the second vertex and a vertex of the first instance bounding box which is not located on any line of the 2D bounding box, and then generate the pseudo-3D bounding box by referring to the class information.

That is, as in FIG. 5 or 6, the vertex P2 of said one instance bounding box and the vertex P6 of said another instance bounding box which are on a line from the vertex B1 to the vertex B4 by way of the vertex B2 may be connected, and the vertex P3 of said one instance bounding box and the vertex P7 of said another instance bounding box which are on a line from the vertex B1 to the vertex B4 by way of the vertex B3 may be connected. Then, the vertex P1 of said one instance bounding box may be connected with the vertex P5 of said another instance bounding box, and, the vertex P4 may be connected with the vertex P8. As a result, the learning device 100 may generate the pseudo-3D bounding box in a form of a cube, and the pseudo-3D bounding box may include a surface formed by the vertices P1, P2, P4, and P3, a surface formed by the vertices P5, P6, P8, and P7, a surface formed by the vertices P1, P5, P7, and P3, a surface formed by the vertices P2, P6, P8, and P4, a surface formed by the vertices P1, P2, P6, and P5, and a surface formed by the vertices P3, P4, P8, and P7.

Then, the learning device 100 may instruct one or more FC loss layers 125-11, 125-12, 125-21, and 125-22 to generate one or more class losses and one or more regression losses by referring to the orientation class information and the regression information and their corresponding one or more GTs, to thereby learn parameters of the FC layers 123-1 and 123-2 by backpropagating the class losses and the regression losses.

As one example, the learning device 100 may (i) instruct one or more first FC loss layers 125-11 and 125-12 corresponding to the first FC layer 123-1 to generate one or more first orientation class losses and one or more first box regression losses by referring to the first orientation class information and the first regression information and their corresponding one or more first GTs, to thereby learn parameters of the first FC layer 123-1 by backpropagating the first orientation class losses and the first box regression losses, and (ii) instruct one or more second FC loss layers 125-21 and 125-22 corresponding to the second FC layer 123-2 to generate one or more second orientation class losses and one or more second box regression losses by referring to the second orientation class information and the second regression information and their corresponding one or more second GTs, to thereby learn parameters of the second FC layer 123-2 by backpropagating the second orientation class losses and the second box regression losses.

In the mean time, the learning device 100 may instruct a type loss layer 126 to generate one or more type losses by referring to the information on whether the image of the object is truncated or non-truncated and its corresponding object-type GT, to thereby adjust one or more parameters of the type-classifying layer 122 by backpropagating the type losses.

As another example, (unlike the example of FIG. 6) on condition that the object detector 10 is being learned by the detector-learning device (not illustrated), the detector-learning device may instruct the type loss layer (not illustrated), in the object detector 10 to generate the type losses by referring to information on whether the image of the object is truncated or non-truncated and its corresponding object-type GT, to thereby adjust at least part of parameters of the type-classifying layer 122 in the object detector by backpropagating the type losses. That is, while the object detector 10 based on the preceding CNN is being learned, the type-classifying layer 122 may also be learned together.

Figure 7:
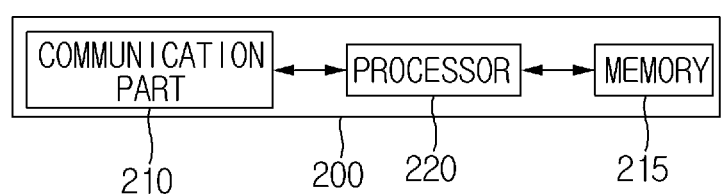
FIG. 7 is a drawing schematically illustrating a testing device for detecting the pseudo-3D bounding box based on the CNN in accordance with another example embodiment of the present disclosure.

FIG. 7 is a drawing schematically illustrating a testing device for detecting the pseudo-3D bounding box based on the CNN in accordance with another example embodiment of the present disclosure, and by referring to FIG. 7, the testing device 200 may include a communication part 210 and a processor 220. In addition, the testing device may further include a memory 215 capable of storing computer readable instructions for performing following processes. As one example, the processor, the memory, a medium, etc. may be integrated with an integrated processor.

For reference, in the description below, the phrase "for training" is added for terms related to the learning processes, and the phrase "for testing" is added for terms related to testing processes, to avoid possible confusion.

Figure 2:
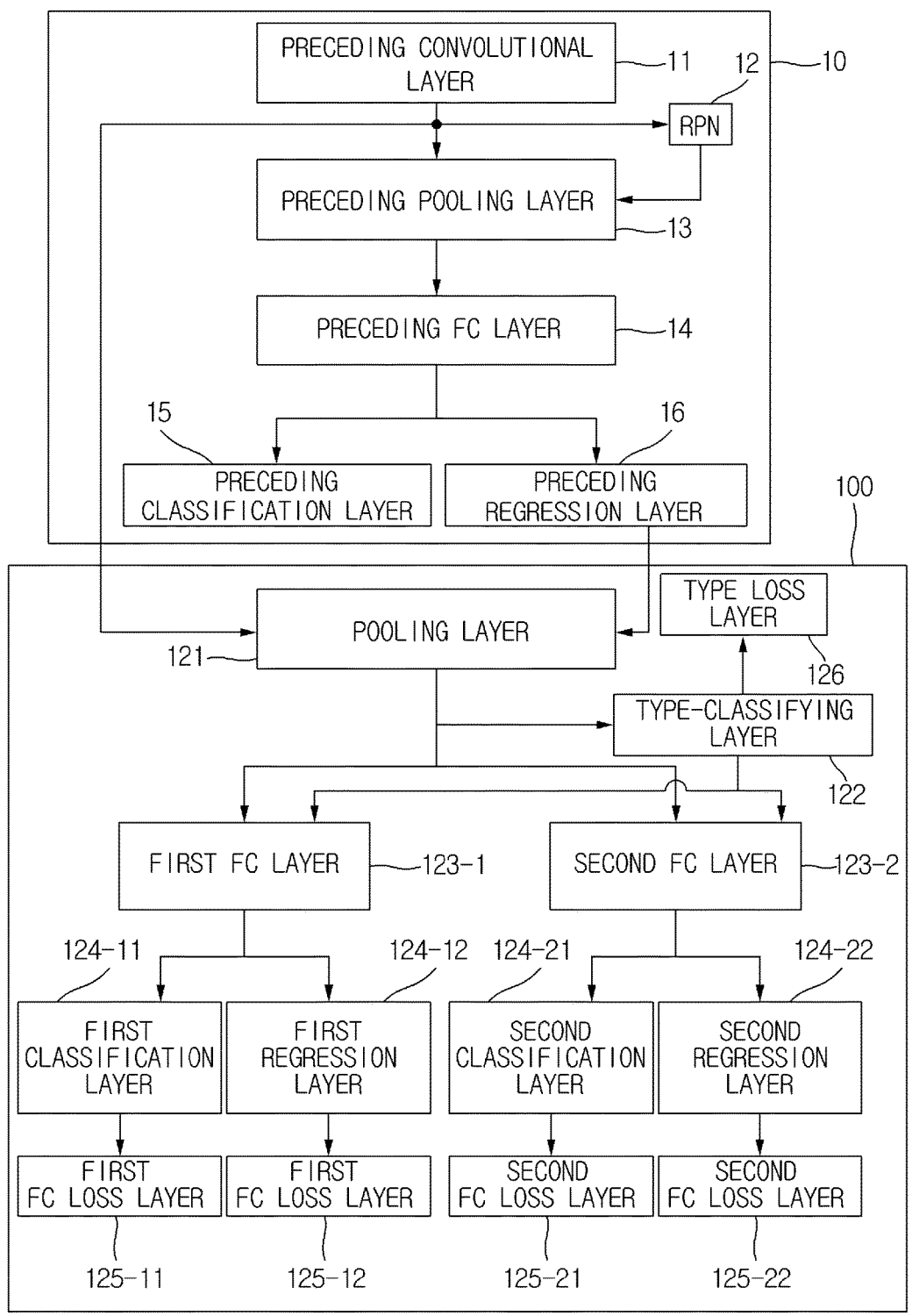
FIG. 2 is a drawing schematically illustrating a learning method for detecting the pseudo-3D bounding box based on the CNN in accordance with one example embodiment of the present disclosure.

First, on condition that the learning device described by referring to FIGS. 1 and 2 has performed processes of (a) if at least one feature map for training and at least one 2D bounding box for training are acquired, where the feature map for training is generated from the convolution operations on at least one training image, and where the 2D bounding box for training includes at least one object for training on the training image, instructing the pooling layer to apply the pooling operation to at least one region, corresponding to the 2D bounding box for training, on the feature map for training, to thereby generate at least one pooled feature map for training, and instructing the type-classifying layer to determine whether an image of the object for training in the pooled feature map for training is truncated or non-truncated, by referring to the pooled feature map for training; (b) supposing that the object for training is the first type if the image of the object for training is truncated and that the object is the second type if the image of the object for training is non-truncated, instructing one of the FC layers, each of which corresponds to each of the first type and the second type, to apply the neural network operation to the pooled feature map for training by referring to information on whether the image of the object for training in the pooled feature map for training is truncated or non-truncated, to thereby generate box pattern information for training corresponding to the pseudo-3D bounding box for training; (c) (i) instructing each of the classification layers corresponding to each of the FC layers to generate orientation class information for training on an orientation of the object for training by referring to the box pattern information for training, and (ii) instructing each of the regression layers corresponding to each of the FC layers to generate regression information for training on coordinates of the pseudo-3D bounding box for training corresponding to coordinates of the 2D bounding box for training by referring to the box pattern information for training; and (d) instructing the FC loss layers to generate the class losses and the regression losses by referring to the orientation class information for training and the regression information for training and their corresponding one or more GTs, to thereby learn parameters of the FC layers by backpropagating the class losses and the regression losses, the communication part 210 may acquire or support another device to acquire at least one feature map for testing and information on at least one 2D bounding box for testing. Herein, the feature map for testing may be generated from the convolution operations on the test image, and the 2D bounding box for testing may include at least one object for testing on the test image from the object detector.

Next, the processor 220 may perform or support another device to perform processes of (a) instructing the pooling layer to apply the pooling operation to at least one region, corresponding to the 2D bounding box for testing, on the feature map for testing, to thereby generate at least one pooled feature map for testing, and instructing the type-classifying layer to determine whether an image of the object for testing in the pooled feature map for testing is truncated or non-truncated, by referring to the pooled feature map for testing; (b) supposing that the object for testing is the first type if the image of the object for testing is truncated and that the object for testing is the second type if the image of the object for testing is non-truncated, instructing one of the FC layers, each of which corresponds to each of the first type and the second type, to apply the neural network operation to the pooled feature map for testing by referring to information on whether the image of the object for testing in the pooled feature map for testing is truncated or non-truncated, to thereby generate box pattern information for testing corresponding to the pseudo-3D bounding box for testing; (c) (i) instructing each of the classification layers corresponding to each of the FC layers to generate orientation class information for testing on an orientation of the object for testing by referring to the box pattern information for testing, and (ii) instructing each of the regression layers corresponding to each of the FC layers to generate regression information for testing on the coordinates of the pseudo-3D bounding box for testing corresponding to the coordinates of the 2D bounding box for testing by referring to the box pattern information for testing.

Herein, the testing device 200 in accordance with another example embodiment of the present disclosure may be a computing device, and may be any device with a processor capable of computation. For reference, although FIG. 7 shows the single testing device 200, the scope of the present disclosure is not limited thereto. For example, the testing device may be configured as several devices to perform its functions.

Figure 8:
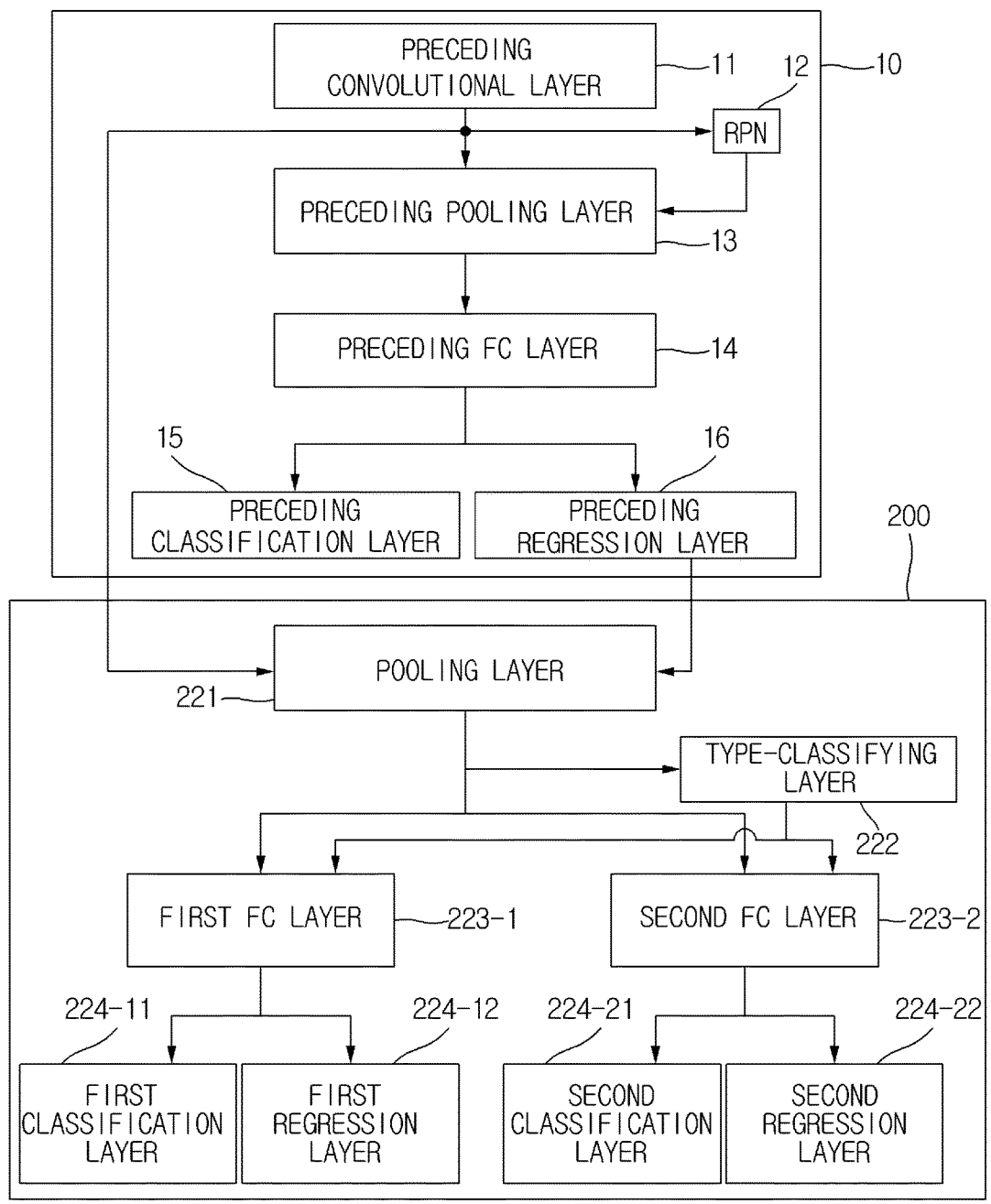
FIG. 8 is a drawing schematically illustrating a testing method for detecting the pseudo-3D bounding box based on the CNN in accordance with another example embodiment of the present disclosure.

A testing method for detecting the pseudo-3D bounding box based on the CNN by using the testing device 200 in accordance with another example embodiment of the present disclosure is described by referring to FIG. 8 as follows. In the description below, the part easily deducible from the learning method described by referring to FIGS. 2 to 6 will be omitted.

First, on condition that at least part of parameters of one or more FC layers 223-1 and 223-2 and a type-classifying layer 222 has been learned by the learning method described by referring to FIGS. 2 to 6, if the test image is inputted into the object detector 10 based on the CNN, the testing device 200 may acquire or support another device to acquire the feature map for testing and information on the 2D bounding box for testing from the object detector 10.

That is, after the object detector 10 acquires the test image, the object detector 10 may instruct the preceding convolutional layer 11, which has been learned, to apply the convolution operations to the test image, to thereby generate at least one preceding feature map for testing. Then, the object detector 10 may instruct the preceding RPN 12 to generate each preceding proposal box for testing corresponding to the object for testing in the test image from the preceding feature map for testing, and may instruct the preceding pooling layer 13 to apply the pooling operation to each region on the preceding feature map for testing corresponding to said each preceding proposal box for testing, to thereby generate at least one preceding pooled feature map for testing. Thereafter, the object detector 10 may instruct the preceding FC layer 14 to apply the neural network operation to the preceding pooled feature map for testing, to thereby generate preceding object pattern information for testing corresponding to the object for testing. Then, the object detector 10 may instruct the preceding classification layer 15 to generate preceding class information for testing on the object for testing by referring to the preceding object pattern information for testing, and may instruct the preceding regression layer 16 to generate preceding regression information for testing corresponding to the object for testing by referring to the preceding object pattern information for testing. As a result, the testing device 200 may acquire or support another device to acquire the preceding feature map for testing as a feature map for testing and information on the 2D bounding box for testing of the objects for testing on the test image, by using the preceding feature map for testing generated from the preceding convolutional layer 11 of the object detector 10 based on the CNN, and preceding regression information for testing generated from the preceding regression layer 16.

Next, if the feature map for testing and the information on the 2D bounding box for testing are acquired, where the feature map for testing is generated from the convolution operations on the test image, and where the 2D bounding box for testing includes the object for testing on the test image, the testing device 200 may instruct a pooling layer 221 to apply the pooling operation to at least one region, corresponding to the 2D bounding box for testing, on the feature map for testing, to thereby generate the pooled feature map for testing.

Then, the testing device 200 may instruct the type-classifying layer 222 to determine whether the image of the object for testing in the pooled feature map for testing is truncated or non-truncated, by referring to the pooled feature map for testing. Herein, the type-classifying layer 222 may include the FC layers which apply the neural network operation to the pooled feature map for testing, or include the FCN, i.e., Fully Convolutional Network.

Then, the testing device 200 may instruct one of FC layers 223-1 and 223-2, each of which corresponds to each of the first type and the second type, to apply the neural network operation to the pooled feature map for testing by referring to the information on whether the image of the object for testing in the pooled feature map for testing is truncated or non-truncated, to thereby generate box pattern information for testing corresponding to the pseudo-3D bounding box.

As one example, if the object for testing is the first type by referring to a result from the type-classifying layer 222, the testing device 200 may instruct a first FC layer 223-1, corresponding to the first type, among the FC layers to apply the neural network operation to the pooled feature map for testing, to thereby generate first box pattern information for testing corresponding to the pseudo-3D bounding box. And if the object for testing is the second type by referring to the result from the type-classifying layer 222, the testing device 200 may instruct a second FC layer 223-2, corresponding to the second type, among the FC layers to apply the neural network operation to the pooled feature map for testing, to thereby generate second box pattern information for testing corresponding to the pseudo-3D bounding box.

Then, the testing device 200 may (i) instruct each of classification layers 224-11 and 224-21 corresponding to each of the FC layers 223-1 and 223-2 to generate orientation class information for testing on the orientation of the object for testing by referring to the box pattern information for testing, and (ii) instruct each of regression layers 224-12 and 224-22 corresponding to each of the FC layers 223-1 and 223-2 to generate regression information for testing on the coordinates of the pseudo-3D bounding box corresponding to the coordinates of the 2D bounding box by referring to the box pattern information for testing.

As one example, the testing device 200 may instruct a first classification layer 224-11 corresponding to the first FC layer 223-1 to generate first orientation class information for testing corresponding to the orientation of the object for testing with the first type by referring to the first box pattern information for testing. For example, the testing device 200 may generate probability information for testing on each of the orientation classes by referring to the first box pattern information for testing, and determine a specific orientation class with a highest probability as the orientation class of the object for testing. And the testing device 200 may instruct a first regression layer 224-12 corresponding to the first FC layer 223-1 to generate first regression information for testing on the coordinates of the pseudo-3D bounding box corresponding to the coordinates of the 2D bounding box by referring to the first box pattern information for testing. The testing device 200 may instruct a second classification layer 224-21 corresponding to the second FC layer 223-2 to generate second orientation class information for testing corresponding to the orientation of the object for testing with the second type by referring to the second box pattern information for testing. For example, the testing device 200 may generate probability information for testing on each of the orientation classes by referring to the second box pattern information for testing, and determine a specific orientation class with a highest probability as the orientation class of the object for testing. And the testing device 200 may instruct a second regression layer 224-22 corresponding to the second FC layer 223-2 to generate second regression information for testing on the coordinates of the pseudo-3D bounding box corresponding to the coordinates of the 2D bounding box by referring to the second box pattern information for testing.

The present disclosure has an effect of generating a 3D bounding box of the object without complex computation required for creation of 3D coordinates and improving the accuracy of detection.

The present disclosure has another effect of simplifying the 3D bounding box for circumscribing a 3D object by using the pseudo-3D bounding box.

The present disclosure has still another effect of reducing computational time and resources by using 2D coordinates of vertices for location of the pseudo-3D bounding box.

Through the learning method and the testing method, the CNN may convert modes according to conditions of objects in an image, and rendering of truncated objects can be performed while virtual driving as the case may be.

Further, the embodiments of the present disclosure can be useful for mobile devices and also for military purpose because there are many cases in which some parts of objects belonging to enemies may be occluded.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for detecting at least one pseudo-3D bounding box based on a CNN, comprising steps of:
   (a) a learning device, if at least one feature map and at least one 2D bounding box are acquired, wherein the feature map is generated from one or more convolution operations on at least one training image, and wherein the 2D bounding box includes at least one object on the training image, instructing a pooling layer to apply at least one pooling operation to at least one region, corresponding to the 2D bounding box, on the feature map, to thereby generate at least one pooled feature map, and instructing a type-classifying layer to determine whether an image of the object in the pooled feature map is truncated or non-truncated, by referring to the pooled feature map;
   (b) the learning device, supposing that the object is a first type if the image of the object is truncated and that the object is a second type if the image of the object is non-truncated, instructing one of FC layers, each of which corresponds to each of the first type and the second type, to apply at least one neural network operation to the pooled feature map by referring to information on whether the image of the object in the pooled feature map is truncated or non-truncated, to thereby generate box pattern information corresponding to the pseudo-3D bounding box;
   (c) the learning device (i) instructing each of classification layers corresponding to each of the FC layers to generate orientation class information on an orientation of the object by referring to the box pattern information, and (ii) instructing each of regression layers corresponding to each of the FC layers to generate regression information on coordinates of the pseudo-3D bounding box corresponding to coordinates of the 2D bounding box by referring to the box pattern information; and
   (d) the learning device instructing one or more FC loss layers to generate one or more class losses and one or more regression losses by referring to the orientation class information and the regression information and their corresponding one or more GTs, to thereby learn parameters of the FC layers by backpropagating the class losses and the regression losses.

2. The method of claim 1, wherein, after the step of (a), the learning device instructs a type loss layer to generate one or more type losses by referring to the information on whether the image of the object is truncated or non-truncated and its corresponding object-type GT, to thereby adjust at least part of parameters of the type-classifying layer by backpropagating the type losses.

3. The method of claim 1, wherein, at the step of (a), the learning device instructs the type-classifying layer to determine the image of the object as truncated if a ratio of an area including only part of the object represented on the pooled feature map to an area including a whole of the object is less than or equal to a certain threshold, and to determine the image of the object as non-truncated if the ratio is greater than the certain threshold.

4. The method of claim 1, wherein, at the step of (c), the learning device instructs each of the regression layers to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

5. The method of claim 1, wherein, at the step of (b), the learning device, if the object is the first type, instructs a first FC layer corresponding to the first type to apply the neural network operation to the pooled feature map, to thereby generate first box pattern information corresponding to the pseudo-3D bounding box, and if the object is the second type, instructs a second FC layer corresponding to the second type to apply the neural network operation to the pooled feature map, to thereby generate second box pattern information corresponding to the pseudo-3D bounding box, and
   wherein, at the step of (c), the learning device (i) instructs a first classification layer corresponding to the first FC layer to generate first orientation class information corresponding to the orientation of the object with the first type by referring to the first box pattern information, and instructs a first regression layer corresponding to the first FC layer to generate first regression information on the coordinates of the pseudo-3D bounding box corresponding to the coordinates of the 2D bounding box by referring to the first box pattern information, and (ii) instructs a second classification layer corresponding to the second FC layer to generate second orientation class information corresponding to the orientation of the object with the second type by referring to the second box pattern information, and instructs a second regression layer corresponding to the second FC layer to generate second regression information on the coordinates of the pseudo-3D bounding box corresponding to the coordinates of the 2D bounding box by referring to the second box pattern information.

6. The method of claim 5, wherein, at the step of (d), the learning device (i) instructs a first FC loss layer corresponding to the first FC layer to generate one or more first orientation class losses and one or more first box regression losses by referring to the first orientation class information and the first regression information and their corresponding one or more first GTs, to thereby learn parameters of the first FC layer by backpropagating the first orientation class losses and the first box regression losses, and (ii) instructs a second FC loss layer corresponding to the second FC layer to generate one or more second orientation class losses and one or more second box regression losses by referring to the second orientation class information and the second regression information and their corresponding one or more second GTs, to thereby learn parameters of the second FC layer by backpropagating the second orientation class losses and the second box regression losses.

7. The method of claim 1, wherein the learning device has acquired the feature map and the 2D bounding box from an object detector based on a preceding CNN.

8. The method of claim 7, wherein the learning device has inputted the training image into the object detector, and the object detector instructs (i) a preceding convolutional layer to generate the feature map by the convolution operations on the training image, (ii) an RPN to generate at least one proposal box corresponding to the object in the training image, from the feature map, (iii) a preceding pooling layer to apply the pooling operation to at least one region, corresponding to the proposal box, on the feature map, to thereby generate a preceding pooled feature map, (iv) a preceding FC layer to generate object pattern information corresponding to the object, (v) a preceding classification layer to generate object class information corresponding to a class of the object by referring to the object pattern information, and (vi) a preceding regression layer to generate preceding regression information on the 2D bounding box corresponding to the object by referring to the object pattern information, to thereby generate the feature map and the 2D bounding box.

9. The method of claim 7, wherein, on condition that the object detector is being learned by a detector-learning device, the detector-learning device instructs a type loss layer in the object detector to generate one or more type losses by referring to information on whether the image of the object is truncated or non-truncated and its corresponding object-type GT, to thereby adjust at least part of parameters of the type-classifying layer in the object detector by backpropagating the type losses.

10. A method for detecting at least one pseudo-3D bounding box based on a CNN, comprising steps of:
(a) on condition that a learning device has acquired at least one feature map for training and at least one 2D bounding box for training, wherein the feature map for training is generated from one or more convolution operations on at least one training image, and wherein the 2D bounding box for training includes at least one object for training on the training image, and has performed processes of (i) instructing a pooling layer to apply at least one pooling operation to at least one region, corresponding to the 2D bounding box for training, on the feature map for training, to thereby generate at least one pooled feature map for training, and instructing a type-classifying layer to determine whether an image of the object for training in the pooled feature map for training is truncated or non-truncated, by referring to the pooled feature map for training, (ii) supposing that the object for training is a first type if the image of the object for training is truncated and that the object is a second type if the image of the object for training is non-truncated, instructing one of FC layers, each of which corresponds to each of the first type and the second type, to apply at least one neural network operation to the pooled feature map for training by referring to information on whether the image of the object for training in the pooled feature map for training is truncated or non-truncated, to thereby generate box pattern information for training corresponding to the pseudo-3D bounding box for training, (iii) instructing each of one or more classification layers corresponding to each of the FC layers to generate orientation class information for training on an orientation of the object for training by referring to the box pattern information for training, and instructing each of one or more regression layers corresponding to each of the FC layers to generate regression information for training on coordinates of the pseudo-3D bounding box for training corresponding to coordinates of the 2D bounding box for training by referring to the box pattern information for training, and (iv) instructing one or more FC loss layers to generate one or more class losses and one or more regression losses by referring to the orientation class information for training and the regression information for training and their corresponding one or more GTs, to thereby learn parameters of the FC layers by backpropagating the class losses and the regression losses;
a testing device, if at least one feature map for testing and at least one 2D bounding box for testing are acquired, wherein the feature map for testing is generated from the convolution operations on at least one test image, and wherein the 2D bounding box for testing includes at least one object for testing on the test image, instructing the pooling layer to apply the pooling operation to at least one region, corresponding to the 2D bounding box for testing, on the feature map for testing, to thereby generate at least one pooled feature map for testing, and instructing the type-classifying layer to determine whether an image of the object for testing in the pooled feature map for testing is truncated or non-truncated, by referring to the pooled feature map for testing;
(b) the testing device, supposing that the object for testing is the first type if the image of the object for testing is truncated and that the object for testing is the second type if the image of the object for testing is non-truncated, instructing one of the FC layers, each of which corresponds to each of the first type and the second type, to apply the neural network operation to the pooled feature map for testing by referring to information on whether the image of the object for testing in the pooled feature map for testing is truncated or non-truncated, to thereby generate box pattern information for testing corresponding to the pseudo-3D bounding box for testing; and
(c) the testing device (i) instructing each of the classification layers corresponding to each of the FC layers to generate orientation class information for testing on the orientation of the object for testing by referring to the box pattern information for testing, and (ii) instructing each of the regression layers corresponding to each of the FC layers to generate regression information for testing on the coordinates of the pseudo-3D bounding box for testing corresponding to the coordinates of the 2D bounding box for testing by referring to the box pattern information for testing.

11. The method of claim 10, wherein the learning device has instructed a type loss layer to generate one or more type losses by referring to the information on whether the image of the object for training is truncated or non-truncated and its corresponding object-type GT, to thereby adjust at least part of parameters of the type-classifying layer by backpropagating the type losses.

12. The method of claim 10, wherein, at the step of (a), the testing device instructs the type-classifying layer to determine the image of the object for testing as truncated if a ratio of an area including only part of the object for testing represented on the pooled feature map for testing to an area including a whole of the object for testing is less than or equal to a certain threshold, and to determine the image of the object for testing as non-truncated if the ratio is greater than the certain threshold.

13. The method of claim 10, wherein, at the step of (c), the testing device instructs each of the regression layers to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

14. The method of claim 10, wherein, at the step of (b), the testing device, if the object for testing is the first type, instructs a first FC layer corresponding to the first type to apply the neural network operation to the pooled feature map for testing, to thereby generate first box pattern information for testing corresponding to the pseudo-3D bounding box for testing, and if the object for testing is the second type, instructs a second FC layer corresponding to the second type to apply the neural network operation to the pooled feature map for testing, to thereby generate second box pattern information for testing corresponding to the pseudo-3D bounding box for testing, and
wherein, at the step of (c), the testing device (i) instructs a first classification layer corresponding to the first FC layer to generate first orientation class information for testing corresponding to the orientation of the object for testing with the first type by referring to the first box pattern information for testing, and instructs a first regression layer corresponding to the first FC layer to generate first regression information for testing on the coordinates of the pseudo-3D bounding box for testing corresponding to the coordinates of the 2D bounding box for testing by referring to the first box pattern information for testing, and (ii) instructs a second classification layer corresponding to the second FC layer to generate second orientation class information for testing corresponding to the orientation of the object for testing with the second type by referring to the second box pattern information for testing, and instructs a second regression layer corresponding to the second FC layer to generate second regression information for testing on the coordinates of the pseudo-3D bounding box for testing corresponding to the coordinates of the 2D bounding box for testing by referring to the second box pattern information for testing.

15. The method of claim 10, wherein the testing device has inputted the test image into an object detector based on a preceding CNN, and the object detector instructs (i) a preceding convolutional layer to generate the feature map for testing by the convolution operations on the test image, (ii) an RPN to generate at least one proposal box for testing corresponding to the object for testing in the test image, from the feature map for testing, (iii) a preceding pooling layer to apply the pooling operation to at least one region, corresponding to the proposal box for testing, on the feature map for testing, to thereby generate a preceding pooled feature map for testing, (iv) a preceding FC layer to generate object pattern information for testing corresponding to the object for testing, (v) a preceding classification layer to generate object class information for testing corresponding to a class of the object for testing by referring to the object pattern information for testing, and (vi) a preceding regression layer to generate preceding regression information for testing on the 2D bounding box for testing corresponding to the object for testing by referring to the object pattern information for testing, to thereby generate the feature map for testing and the 2D bounding box for testing.

16. A learning device for detecting at least one pseudo-3D bounding box based on a CNN, comprising:
at least one memory that stores instructions; and
at least one processor configured to execute the instructions to: perform processes of (I) instructing a pooling layer to apply at least one pooling operation to at least one region, corresponding to at least one 2D bounding box, on at least one feature map, to thereby generate at least one pooled feature map, wherein the feature map is generated from one or more convolution operations on at least one training image, and wherein the 2D bounding box includes at least one object on the training image, and instructing a type-classifying layer to determine whether an image of the object in the pooled feature map is truncated or non-truncated, by referring to the pooled feature map, (II) supposing that the object is a first type if the image of the object is truncated and that the object is a second type if the image of the object is non-truncated, instructing one of FC layers, each of which corresponds to each of the first type and the second type, to apply at least one neural network operation to the pooled feature map by referring to information on whether the image of the object in the pooled feature map is truncated or non-truncated, to thereby generate box pattern information corresponding to the pseudo-3D bounding box, (III) (i) instructing each of classification layers corresponding to each of the FC layers to generate orientation class information on an orientation of the object by referring to the box pattern information, and (ii) instructing each of regression layers corresponding to each of the FC layers to generate regression information on coordinates of the pseudo-3D bounding box corresponding to coordinates of the 2D bounding box by referring to the box pattern information, and (IV) instructing one or more FC loss layers to generate one or more class losses and one or more regression losses by referring to the orientation class information and the regression information and their corresponding one or more GTs, to thereby learn parameters of the FC layers by back-propagating the class losses and the regression losses.

17. The learning device of claim 16, wherein, after the process of (I), the processor instructs a type loss layer to generate one or more type losses by referring to the information on whether the image of the object is truncated or non-truncated and its corresponding object-type GT, to thereby adjust at least part of parameters of the type-classifying layer by backpropagating the type losses.

18. The learning device of claim 16, wherein, at the process of (I), the processor instructs the type-classifying layer to determine the image of the object as truncated if a ratio of an area including only part of the object represented on the pooled feature map to an area including a whole of the object is less than or equal to a certain threshold, and to determine the image of the object as non-truncated if the ratio is greater than the certain threshold.

19. The learning device of claim 16, wherein, at the process of (III), the processor instructs each of the regression layers to generate the regression information by using at least either of (i) each displacement from vertices of the 2D bounding box to vertices of each of instance bounding boxes corresponding to each of a front face and a rear face of the object, and (ii) each displacement from a center of the 2D bounding box to each center of each of the instance bounding boxes and each difference between a ratio of width to height of the 2D bounding box and each of ratios of width to height of the instance bounding boxes.

20. The learning device of claim 16, wherein, at the process of (II), the processor, if the object is the first type, instructs a first FC layer corresponding to the first type to apply the neural network operation to the pooled feature map, to thereby generate first box pattern information corresponding to the pseudo-3D bounding box, and if the object is the second type, instructs a second FC layer corresponding to the second type to apply the neural network operation to the pooled feature map, to thereby generate second box pattern information corresponding to the pseudo-3D bounding box, and wherein, at the process of (III), the processor (i) instructs a first classification layer corresponding to the first FC layer to generate first orientation class information corresponding to the orientation of the object with the first type by referring to the first box pattern information, and instructs a first regression layer corresponding to the first FC layer to generate first regression information on the coordinates of the pseudo-3D bounding box corresponding to the coordinates of the 2D bounding box by referring to the first box pattern information, and (ii) instructs a second classification layer corresponding to the second FC layer to generate second orientation class information corresponding to the orientation of the object with the second type by referring to the second box pattern information, and instructs a second regression layer corresponding to the second FC layer to generate second regression information on the coordinates of the pseudo-3D bounding box corresponding to the coordinates of the 2D bounding box by referring to the second box pattern information.

21. The learning device of claim 20, wherein, at the process of (IV), the processor (i) instructs a first FC loss layer corresponding to the first FC layer to generate one or more first orientation class losses and one or more first box regression losses by referring to the first orientation class information and the first regression information and their corresponding one or more first GTs, to thereby learn parameters of the first FC layer by backpropagating the first orientation class losses and the first box regression losses, and (ii) instructs a second FC loss layer corresponding to the second FC layer to generate one or more second orientation class losses and one or more second box regression losses by referring to the second orientation class information and the second regression information and their corresponding one or more second GTs, to thereby learn parameters of the second FC layer by backpropagating the second orientation class losses and the second box regression losses.

22. The learning device of claim 16, wherein the communication part has acquired the feature map and the 2D bounding box from an object detector based on a preceding CNN.

23. The learning device of claim 22, wherein the communication part has inputted the training image into the object detector, and the object detector instructs (i) a preceding convolutional layer to generate the feature map by the convolution operations on the training image, (ii) an RPN to generate at least one proposal box corresponding to the object in the training image, from the feature map, (iii) a preceding pooling layer to apply the pooling operation to at least one region, corresponding to the proposal box, on the feature map, to thereby generate a preceding pooled feature map, (iv) a preceding FC layer to generate object pattern information corresponding to the object, (v) a preceding classification layer to generate object class information corresponding to a class of the object by referring to the object pattern information, and (vi) a preceding regression layer to generate preceding regression information on the 2D bounding box corresponding to the object by referring to the object pattern information, to thereby generate the feature map and the 2D bounding box.

24. The learning device of claim 22, wherein, on condition that the object detector is being learned by a detector-learning device, the detector-learning device instructs a type loss layer in the object detector to generate one or more type losses by referring to information on whether the image of the object is truncated or non-truncated and its corresponding object-type GT, to thereby adjust at least part of parameters of the type-classifying layer in the object detector by backpropagating the type losses.

25. A testing device for detecting at least one pseudo-3D bounding box based on a CNN, comprising:
at least one memory that stores instructions; and
at least one processor, on condition that a learning device has acquired at least one feature map for training and at least one 2D bounding box for training, wherein the feature map for training is generated from one or more convolution operations on at least one training image, and wherein the 2D bounding box for training includes at least one object for training on the training image, and has performed processes of (i) instructing a pooling layer to apply at least one pooling operation to at least one region, corresponding to the 2D bounding box for training, on the feature map for training, to thereby generate at least one pooled feature map for training, and instructing a type-classifying layer to determine whether an image of the object for training in the pooled feature map for training is truncated or non-truncated, by referring to the pooled feature map for training, (ii) supposing that the object for training is a first type if the image of the object for training is truncated and that the object is a second type if the image of the object for training is non-truncated, instructing one of FC layers, each of which corresponds to each of the first type and the second type, to apply at least one neural network operation to the pooled feature map for training by referring to information on whether the image of the object for training in the pooled feature map for training is truncated or non-truncated, to thereby generate box pattern information for training corresponding to the pseudo-3D bounding box for training, (iii) instructing each of one or more classification layers corresponding to each of the FC layers to generate orientation class information for training on an orientation of the object for training by referring to the box pattern information for training, and instructing each of one or more regression layers corresponding to each of the FC layers to generate regression information for training on coordinates of the pseudo-3D bounding box for training corresponding to coordinates of the 2D bounding box for training by referring to the box pattern information for training, and (iv) instructing one or more FC loss layers to generate one or more class losses and one or more regression losses by referring to the orientation class information for training and the regression information for training and their corresponding one or more GTs, to thereby learn parameters of the FC layers by backpropagating the class losses and the regression losses; configured to execute the instructions to: perform processes of (I) instructing the pooling layer to apply the pooling operation to at least one region, corresponding to at least one 2D bounding box for testing, on at least one feature map for testing, to thereby generate at least one pooled feature map for testing, wherein the feature map for testing is generated from the convolution operations on at least one test image, and wherein the 2D bounding box for testing includes at least one object for testing on the test image, and instructing the type-classifying layer to determine whether an image of the object for testing in the pooled feature map for testing is truncated or non-truncated, by referring to the pooled feature map for testing, (II) supposing that the object for testing is the first type if the image of the object for testing is truncated and that the object for testing is the second type if the image of the object for testing is non-truncated, instructing one of the FC layers, each of which corresponds to each of the first type and the second type, to apply the neural network operation to the pooled feature map for testing by referring to information on whether the image of the object for testing in the pooled feature map for testing is truncated or non-truncated, to thereby generate box pattern information for testing corresponding to the pseudo-3D bounding box for testing, and (III) (i) instructing each of the classification layers corresponding to each of the FC layers to generate orientation class information for testing on the orientation of the object for testing by referring to the box pattern information for testing, and (ii) instructing each of the regression layers corresponding to each of the FC layers to generate regression information for testing on the coordinates of the pseudo-3D bounding box for testing corresponding to the coordinates of the 2D bounding box for testing by referring to the box pattern information for testing.

26. The testing device of claim 25, wherein the learning device has instructed a type loss layer to generate one or more type losses by referring to the information on whether the image of the object for training is truncated or non-truncated and its corresponding object-type GT, to thereby adjust at least part of parameters of the type-classifying layer by backpropagating the type losses.

27. The testing device of claim 25, wherein, at the process of (I), the processor instructs the type-classifying layer to determine the image of the object for testing as truncated if a ratio of an area including only part of the object for testing represented on the pooled feature map for testing to an area including a whole of the object for testing is less than or equal to a certain threshold, and to determine the image of the object for testing as non-truncated if the ratio is greater than the certain threshold.

28. The testing device of claim 25, wherein, at the process of (III), the processor instructs each of the regression layers to generate the regression information for testing by using at least either of (i) each displacement from vertices of the 2D bounding box for testing to vertices of each of instance bounding boxes for testing corresponding to each of a front face and a rear face of the object for testing, and (ii) each displacement from a center of the 2D bounding box for testing to each center of each of the instance bounding boxes for testing and each difference between a ratio of width to height of the 2D bounding box for testing and each of ratios of width to height of the instance bounding boxes for testing.

29. The testing device of claim 25, wherein, at the process of (II), the processor, if the object for testing is the first type, instructs a first FC layer corresponding to the first type to apply the neural network operation to the pooled feature map for testing, to thereby generate first box pattern information for testing corresponding to the pseudo-3D bounding box for testing, and if the object for testing is the second type, instructs a second FC layer corresponding to the second type to apply the neural network operation to the pooled feature map for testing, to thereby generate second box pattern information for testing corresponding to the pseudo-3D bounding box for testing, and wherein, at the process of (III), the processor (i) instructs a first classification layer corresponding to the first FC layer to generate first orientation class information for testing corresponding to the orientation of the object for testing with the first type by referring to the first box pattern information for testing, and instructs a first regression layer corresponding to the first FC layer to generate first regression information for testing on the coordinates of the pseudo-3D bounding box for testing corresponding to the coordinates of the 2D bounding box for testing by referring to the first box pattern information for testing, and (ii) instructs a second classification layer corresponding to the second FC layer to generate second orientation class information for testing corresponding to the orientation of the object for testing with the second type by referring to the second box pattern information for testing, and instructs a second regression layer corresponding to the second FC layer to generate second regression information for testing on the coordinates of the pseudo-3D bounding box for testing corresponding to the coordinates of the 2D bounding box for testing by referring to the second box pattern information for testing.

30. The testing device of claim 25, wherein the communication part has inputted the test image into an object detector based on a preceding CNN, and the object detector instructs (i) a preceding convolutional layer to generate the feature map for testing by the convolution operations on the test image, (ii) an RPN to generate at least one proposal box for testing corresponding to the object for testing in the test image, from the feature map for testing, (iii) a preceding pooling layer to apply the pooling operation to at least one region, corresponding to the proposal box for testing, on the feature map for testing, to thereby generate a preceding pooled feature map for testing, (iv) a preceding FC layer to generate object pattern information for testing corresponding to the object for testing, (v) a preceding classification layer to generate object class information for testing corresponding to a class of the object for testing by referring to the object pattern information for testing, and (vi) a preceding regression layer to generate preceding regression information for testing on the 2D bounding box for testing corresponding to the object for testing by referring to the object pattern information for testing, to thereby generate the feature map for testing and the 2D bounding box for testing.

* * * * *